United States Patent [19]

Ebihara et al.

[11] Patent Number: 5,557,413
[45] Date of Patent: Sep. 17, 1996

[54] IMAGE OUTPUT APPARATUS

[75] Inventors: Norio Ebihara; Noboru Asamizuya; Nobuchika Momochi, all of Kanagawa, Japan

[73] Assignee: Sony Corporation, Tokyo, Japan

[21] Appl. No.: 217,743

[22] Filed: Mar. 25, 1994

[30] Foreign Application Priority Data

Mar. 29, 1993 [JP] Japan .................................. 5-069828

[51] Int. Cl.$^6$ ...................................................... H04N 1/21
[52] U.S. Cl. ........................................... 358/296; 347/241
[58] Field of Search ................... 355/22, 296; 358/296, 358/298; 347/244, 241, 256

[56] References Cited

U.S. PATENT DOCUMENTS

| | | | |
|---|---|---|---|
| 3,895,867 | 7/1975 | Lo et al. ..................... | 355/77 |
| 5,028,950 | 7/1991 | Fritsch ....................... | 355/22 |
| 5,113,213 | 5/1992 | Sander et al. ............... | 355/22 |
| 5,349,419 | 9/1994 | Taguchi et al. ............. | 355/22 |

FOREIGN PATENT DOCUMENTS

| | | |
|---|---|---|
| 0566125 | 10/1993 | European Pat. Off. . |
| 0570806 | 11/1993 | European Pat. Off. . |
| 2-87792 | 3/1990 | Japan . |
| 3-97390 | 4/1991 | Japan . |

OTHER PUBLICATIONS

Television Association Magazine vol. 45, Nov. 11, 1991
Production Research, vol. 41, No. 11, Nov. 1989.
EPO Search Report.

*Primary Examiner*—Benjamin R. Fuller
*Assistant Examiner*—Raquel Yvette Gordon
*Attorney, Agent, or Firm*—Ronald P. Kananen

[57] ABSTRACT

An image out put system including an image printer 53 for printing images on a lenticular lens sheet 16 and a computer for controlling the image printer 53, while a plurality of images are being superimposition printed on the lenticular lens sheet 16, by making the size and the feed for each pixel smaller in the first direction so as to superimpose pixels when printing, or by narrowing the shape of each pixel in this first direction and then reducing the feed for each pixel by the portion by which each of the pixels have been narrowed. It is possible to make the number of pixels per unit length of the first direction large.

4 Claims, 12 Drawing Sheets

IMAGE OUTPUT APPARATUS

BACKGROUND OF THE INVENTION

1. Field of the Invention

The present invention relates to an image output apparatus, and more particularly to an image output apparatus for outputting a three-dimensional image.

2. Description of the Related Art

A method known as the multi-view three-dimensional picture display method is given in U.S. Pat. No. 3,895,867 in which pictures are taken with a camera using a photographic film which will accept a plurality of images which are shifted with respect to each other only by the parallax in perspective between a pair of views. The negative imprinted on this film is then used to make a combined image by going from a plurality of points via a lenticular lens. This image is then printed. If this printed image is then viewed via the same lenticular lens, an image which appears to be three-dimensional can then be viewed without the aid of glasses.

Also, a method for obtaining a three-dimensional image has been proposed in Japanese Patent Application Laid-Open No. Hei 2-87792 in which a plurality of television images picked up by using a plurality of television cameras are synthesized and displayed on a display of the television set and the synthesized image is observed through a lenticular lens provided on the display field surface.

Furthermore, a method is put forward where an item such as a lenticular lens made up from a large number of rows of semi-cylindrical lenses is used. When a large number of images arranged along a first direction are then viewed, only one of these images is selected to be expanded from its compressed size for viewing so that a three-dimensional visual effect results. This kind of display method is put forward in, for example, in Television Association Magazine Vol. 45, No. 11, pp. 1472 to 1474 (1991) entitled 50-inch multi-vision three-dimensional television without glasses.

In the image arrangement for carrying out the aforementioned display method, for example, n cameras are used to pick up images of the target (object) from different perspectives. When each of the images obtained by these n cameras are composed, n pixels will correspond to one pitch p, the width of the lens taken along the direction at right angles to the generating line for a single semi-cylindrical lens, of the lenticular lens, and just one of these n pixels will correspond to each of the n cameras. As only one of the n pixels within a single pitch p will correspond to one of the n cameras, (n-1) of the frames taken by each camera can be discarded, i.e. (n-1) pixels are cancelled out.

By arranging the pixels and projecting the synthesized image onto a screen made of a diffusion plate and a lenticular lens in accordance with this method, when viewing is carried out via the lenticular lens, just one pixel will be selected for display from the n pixels within a single pitch for a single perspective, i.e. one view. It follows that as different perspectives are displayed for two-view, i.e. two perspectives, displays such as three dimensional displays become possible.

Figure 11A:
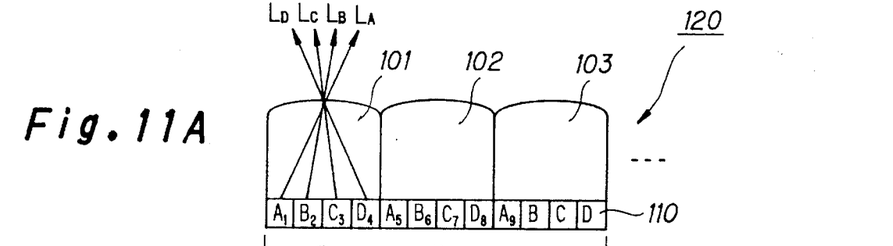
FIGS. 11a, 11b and 11c are views showing the thinning out of the pixels and the pixel rows in the prior art.
Figure 11B:
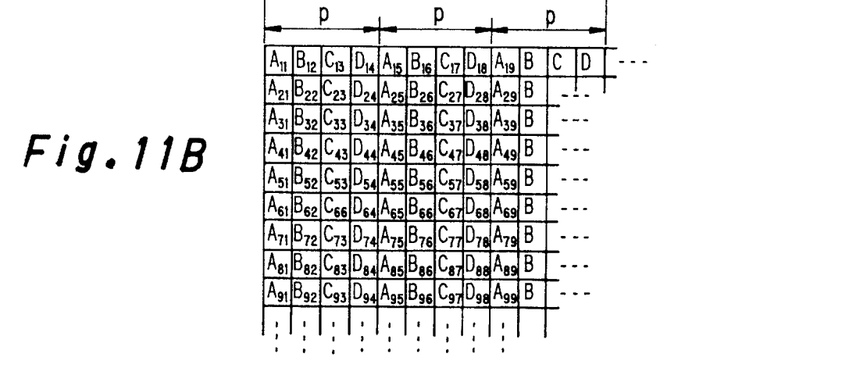
Figure 11C:
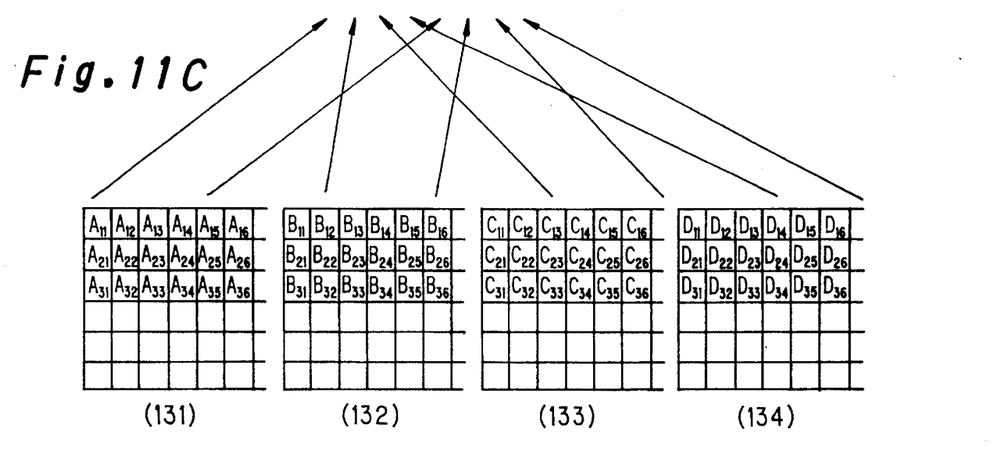

The aforementioned thinning out of the composite pixel arrangement for the n images will be described using FIG. 11. FIG. 11a is an outline cut-away view of one part of lenticular lens sheet 120 made up of an arrangement of lenticular lenses consisting of a plurality of semi-cylindrical lenses 101, 102, 103, ... placed on the front surface of a light diffusion type display board 110 for displaying, for example, n images to be described in the following. Also, FIG. 11c shows each of the pixels and their rows for the images taken by the plurality of cameras. In the example in FIG. 11 there are four cameras, 131 to 134, with pixels A11, A12, ... A36 for camera 131, pixels B11, B12, ... B36 for camera 132, pixels C11, C12, ... C36 for camera 133 and pixels D11, D12, ... for camera 134. FIG. 11b then shows the arrangement of each of the pixels for images displayed within a single pitch of each of the semi-cylindrical lenses as viewed from below, from the display board side of the lenticular lens sheet 120 in FIG. 11a.

In FIGS. 11a to 11c, for example, the only pixels which are selected for displaying from within one pitch of the semi-cylindrical lens 101 are the column of A11, A21, A31, ... pixels from camera 131, the column of B12, B22, B31, ... pixels from camera 132, the column of C13, C23, C33, ... pixels from camera 133 and the column of D14, D24, D34, ... pixels from camera 134. These are then displayed in columns at the display board 110 as is shown in FIG. 11b. Also, the only pixels which are selected for displaying from within one pitch of the semi-cylindrical lens 102 are the column of A15, A25, A35, ... pixels from camera 131, the column of B16, B26, B36, ... pixels from camera 132, the column of C17, C27, C37, ... pixels from camera 133 and the column of D18, D28, D38, ... pixels from camera 134. These are then displayed in columns at the display board 110 as is shown in FIG. 11b. Predetermined columns of pixel data from each of the respective pixels from cameras 131 to 134 in FIG. 11c are then also selected from within a pitch of the semi-cylindrical lens 103 to be displayed in rows at the display board 110.

In this way, images from each of the plurality (four) of cameras 131 to 134 are now displayed at the display board 110 of the lenticular lens sheet 120. If these images displayed on the display board 110 are then viewed via each of the semi-cylindrical lenses 101, 102, 103, ..., it is possible to see different images for each of the different perspectives LA to LD. For instance, an image photographed by camera 131 can be viewed at perspective LA, an image photographed by camera 132 can be viewed at perspective LB, an image photographed by camera 133 can be viewed at perspective LC and an image photographed by camera 134 can be viewed at perspective LD.

Also, thinning out is carried out for each of the pixels when images from each of the cameras 131 to 134 are displayed at the display board 110. For example, A12, A22, A32, ..., A13, A23, A33, ..., A14, A24, A34, ..., A16, A26, A36, ... from each of the images taken by camera 131 in FIG. 11, B11, B21, B31, ..., B13, B23, B33, ..., B14, B24, B34, ..., B15, B25, B35, ... from each of the images taken by camera 132, C12, C22, C32, ..., C13, C23, C33, .., C14, C24, C34, ..., C15, C25, C35, ..., C16, C26, C36, ... from each of the images taken by camera 133 and D11, D21, D31, ..., D12, D22, D32, ..., D13, D23, D33f ..., D15, D25, D35, ..., D16, D26, D36, ... from each of the images taken by camera 134 are all cancelled.

When the cancellation is effected, the image is enlarged in a direction which is at right angles to the direction of the generating lines for each of the semi-cylindrical lenses 101, 102, 103, ... shown in FIG. 11 which make up the lenticular lens. By using a lenticular lens sheet having these kinds of characteristics, an image having a height to width ratio of 1:1 can be obtained as for a normal display apparatus.

A three-dimensional display apparatus employing a method for structuring more detailed images where the pixels are arranged in rows is described in Laid-open publication Hei 3-97390. According to the apparatus in this publication, in the same way as the aforementioned literature, 50-inch multi-vision three-dimensional television not requiring glasses, pixel data for n source images are gathered in 1/n parcels by cancelling out to get a source size image. However, in addition to this, cancelling out is carried out and n differing pixels are lined up every one pitch in the horizontal direction, i.e. in a direction perpendicular to that of the generating lines for the lenticular lens. The same pixels are then repeatedly lined up n times in the lengthwise direction of the lenticular lens, i.e. the direction of the generating lines, so as to give a method with an n×n image size.

Figure 12A:
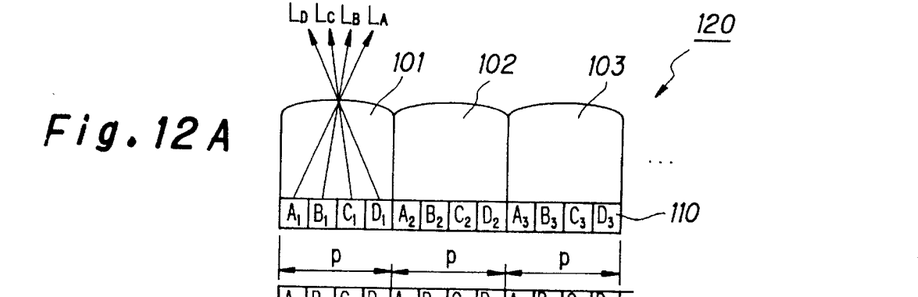
FIGS. 12a, 12b and 12c are views showing the n×n enlargement of the images and the rows of the pixels.
Figure 12B:
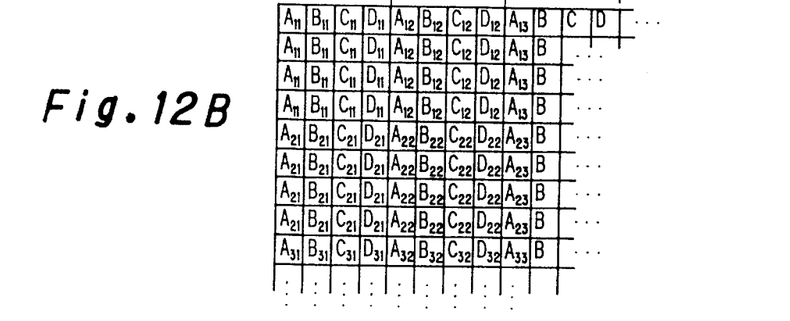

A description will now be given using FIGS. 12a to 12c of the pixel arrangement when an n×n image size is obtained by repeatedly displaying pixels n times along the lengthwise direction of the lenticular lens. Here, FIG. 12a is a cut-away outline of the surface of one part of the same lenticular lens sheet 120. As in FIG. 11a, FIG. 12c, in the same way as FIG. 11c, is a view of each of the pixels and rows for the images taken by, for example, the four cameras 131 to 134. FIG. 12b shows the arrangement, i.e. the arrangement when viewed from the lower surface of the lenticular lens sheet 120, of each of the pixels to give an n×n image size.

Figure 12C:
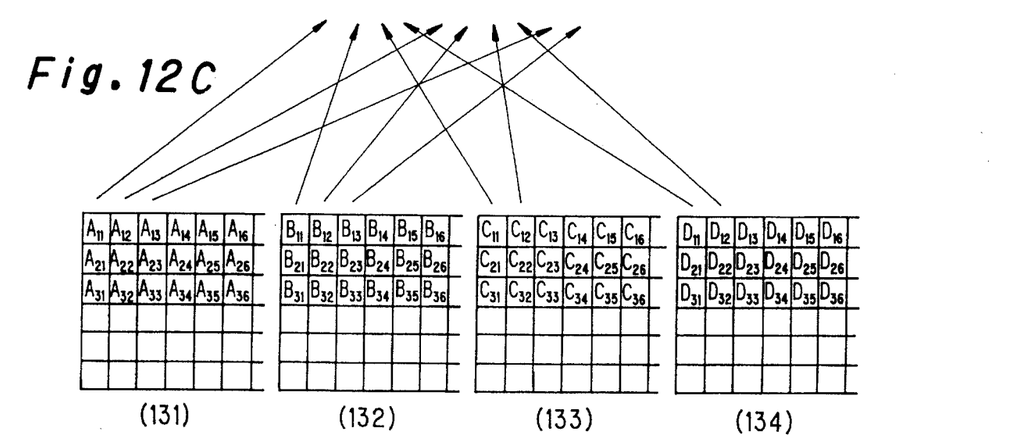

In FIG. 12, for example, each of the pixels displayed from within one pitch p of the semi-cylindrical lens 101 are, as is shown in FIG. 12b, the pixel column A11, A21, A31, ..., the column B11, B21, B31, ..., the column C11, C21, C31, ..., and the column D11, D21, D31, ... which have been selected from the pixels in FIG. 12c coming from the cameras 131 to 134. Also, for the case in FIG. 12, these pixels are repeated in groups of n (which in this case is 4) along the direction of the generating lines (i.e. the longitudinal direction) of the respective semi-cylindrical lenses. For instance, the column A11, A11, A11, A11, A21, A21, A21, A21, A31, A31, ..., the column B11, B11, B11, B11, B21, B21, B21, B21, B31, B31, ..., the column C11, C11, C11, C11, C21, C21, C21, C21, C31, C31, ... and the column D11, D11, D11, D11, D21, D21, D21, D21, D31, D31, ..., are arranged along the generating line direction within a pitch p of the semi-cylindrical lens 101. In the same way, the column A12, A12, A12, A12, A22, A22, A22, A22, A32, A32, ..., the column B12, B12, B12, B12, B22, B22, B22, B22, B32, B32, ..., the column C12, C12, C12, C12, C22, C22, C22, C22, C32, C32, ... and the column D12, D12, D12, D12, D22, D22, D22, D22, D32, D32, ..., are arranged within a pitch p of the semi-cylindrical lens 102 and the column A13, A13, A13, A13, A23, A23, A23, A23, A33, A33, ..., the column B13, B13, B13, B13, B23, B23, B23, B23, B33, B33, ..., the column C13, C13, C13, C13, C23, C23, C23, C23, C33, C33, ... and the column D13, D13, D13, D13, D23, D23, D23, D23, D33, D33, ..., are arranged within a pitch p of the semi-cylindrical lens 103.

In this way, if these images displayed on the display board 110 are then viewed via each of the semi-cylindrical lenses 101, 102, 103, ..., it is possible to see different images for each of the different perspectives LA to LD. Also, the same pixels are lined up in rows of four along the generating line direction of the image for the semi-cylindrical lens and by also enlarging the image in a direction which is parallel to the generating line direction, in this case by four times, an image which is 4×4 larger can be viewed.

Accordingly, it may be possible to view an image which differs depending on the perspective by picking out just one pixel of images taken by a plurality of cameras for each pitch of p of the lenticular lenses in the kind of lenticular lens sheet 120 shown in FIGS. 11a to 11c. However, as it is intended to carry out corrections on the enlargement of the picture in the direction which is at right angles to the angle of the generating lines for each of the semi-cylindrical lenses, the pixels have to be cancelled, which causes the picture quality to be inferior when compared to usual display apparatus.

Also, with the kind of display board 120 shown in FIGS. 12a to 12c, the pixels are repeatedly displayed n times along the longitudinal direction of the lenticular lenses so as to give an n×n image size. However, in this case, the image size becomes large when compared with that for normal display apparatus. The apparatus therefore has to be made large in order to display the entire image and the large volume of data is difficult to handle. It is also not possible to achieve a density which is high when compared with normal display apparatus.

On the other hand, in the method proposed in the above-described U.S. Pat. No. 3,895,867 where photographic pictures are taken with a camera onto a photographic film, a processing dark room is required for putting the images on film and a solid display cannot be displayed if the actual object is not photographed. Also, as the resolution now depends solely on the resolution of the light sensitive paper, the resolution of, for example, a high resolution print for a directional display cannot be improved. The image is also enlarged in a direction which is at right angles to the direction of the generating lines for the semi-cylindrical lenses so as to give the same resolution in the direction of the generating lines for the semi-cylindrical lenses and in the direction which is at right angles to the direction of the generating lines and this also causes deterioration in the picture quality.

Also, the methods explained in conjunction with FIGS. 11a to 11c and FIGS. 12a to 12c suffer from a disadvantage that a device for projecting the three-dimensional image onto the planar display board is always required for observing the 3D image although the method can obtain the 3D image in a real time fashion.

SUMMARY OF THE INVENTION

As the present invention sets out to solve the problems encountered in the prior art, its object is to provide an image output apparatus which is capable of returning one image from a row of images in one direction to the size of the original source image when viewed via an item such as a lenticular lens in such a manner so as to make a picture display with little deterioration in picture quality possible.

According to the present invention there is provided an image output apparatus for printing images, in which a plurality of images are superimposed and printed in one direction, and one of the plurality of images is displayed when being observed, comprising:

an image synthesizing means for synthesizing the plurality of images;

a print means for printing the synthesized images on one surface of a lenticular sheet having lenticular lenses on the other surface;

a detection means for detecting a position of the lenticular sheet; and a control means for controlling the print means.

The position of the lenticular sheet and/or an output of the print means are controlled on the basis of the detection result of the detection means, and pixels at the same position of the plurality images obtained by a plurality of image pickup devices are printed in correspondence with a plurality of unit lenses which form the lenticular lenses.

The detection means may comprise: a projection portion for projecting a ray of light to the lenticular lenses; and an optical detection means for detecting an amount of transmissive and/or reflective light relative to the lenticular lenses whereby the position of the lenticular sheet may be detected on the basis of the amount of light detected by the optical detection portion.

According to another aspect of the invention there is provided an image output apparatus for printing images by superimposition printing a plurality of images in a first direction in such a manner that one of these images is displayed through lenticular lenses when being observed, comprising:

a printer for printing the images; and a controller for controlling the printer, wherein a large number of pixels are printed per unit length of the first direction by printing the pixels so as to be superimposed by making a feed for each pixel in the first direction smaller than the size of the pixel in the first direction while the plurality of pixels are being superimposition printed.

According to still another aspect of the invention, there is provided an image output apparatus for printing images by superimposition printing a plurality of images in a first direction in such a manner that one of the images is displayed through lenticular lenses when being observed, comprising:

printer for printing the images; and a controller for controlling the printer, wherein a large number of pixels are printed per unit length of the first direction by shortening the length of the pixels in the first direction to make the pixels narrow, and reducing the feed for these pixels in the first direction by an amount corresponding to the extent to which the pixels were made narrow while the plurality of pixels are being superimposition printed.

According to still another aspect of the invention, there is provided an image output apparatus for printing images by superimposition printing n images in a first direction at a fixedly repeating pitch p in such a manner that one of the n images is displayed through lenticular lenses when being observes, comprising:

printer for printing the images; and a controller for controlling the printer, wherein a fixed number of pixels m are printed for each image, and pixels corresponding to n images are printed within one pitch p where a feed s in the first direction for each pixel is given substantially by $s=p/(n \times m)$ where the n images are being superimposition printed.

The pitch p corresponds to a pitch of the lenticular lenses.

The feed s is changeable and printing is also possible at a different pitch p.

The size w of the pixels along the first direction is given substantially by $w=p/(n \times m)$.

According to another aspect of the invention, there is provided an image printing apparatus for printing images by superimposition printing a plurality of images in a first direction in such a manner that one of the plurality of images is displayed through lenticular lenses when the images are observed, comprising:

printer for printing the images; and a controller for controlling the printer, wherein a large number of pixels are printed per unit length of the first direction, and the feed for each pixel is corrected and then printed when the enlargement rate of the image in the direction which is at right angles to the first direction is different to that for the image which has been displayed in the first direction while the plurality of pixels are being superimposition printed.

According to the image output apparatus in the present invention, by making the feed and size of each pixel in the first direction smaller so as to superimpose the pixels when printing while the plurality of images are being superimposition printed, or by narrowing the shape of the images in this first direction and then reducing the feed for each pixel by the portion by which each of the pixels have been narrowed, it is possible to make the number of pixels per unit length of this first direction large.

Also, according to the apparatus in this invention, a fixed number of pixels are printed for each image while n images are being superimposition printed along a first direction at a fixedly repeating pitch p and pixels corresponding to n images are printed within one pitch p where a feed s in the first direction for each pixel is given substantially by $s=p/(n \times m)$.

Further, with the printer apparatus for this invention, the feed for each pixel is changed and the shape of the pixels is narrowed along the first direction so that a large number of pixels can be printed per unit length of this first direction. This means that the enlargement rate for an image in this superimposition direction (first direction) and in a direction which is at right angles to it is then different. Correction (resizing) is therefore carried out on the feed for the pixels in this first direction before printing, which will remove distortions in the height-width ratio of the viewed image.

BRIEF DESCRIPTION OF THE PREFERRED EMBODIMENTS

In the accompanying drawings.

DESCRIPTION OF THE PREFERRED EMBODIMENTS

The following is a detailed description with reference to the drawings of an embodiment of the present invention.

Figure 1:
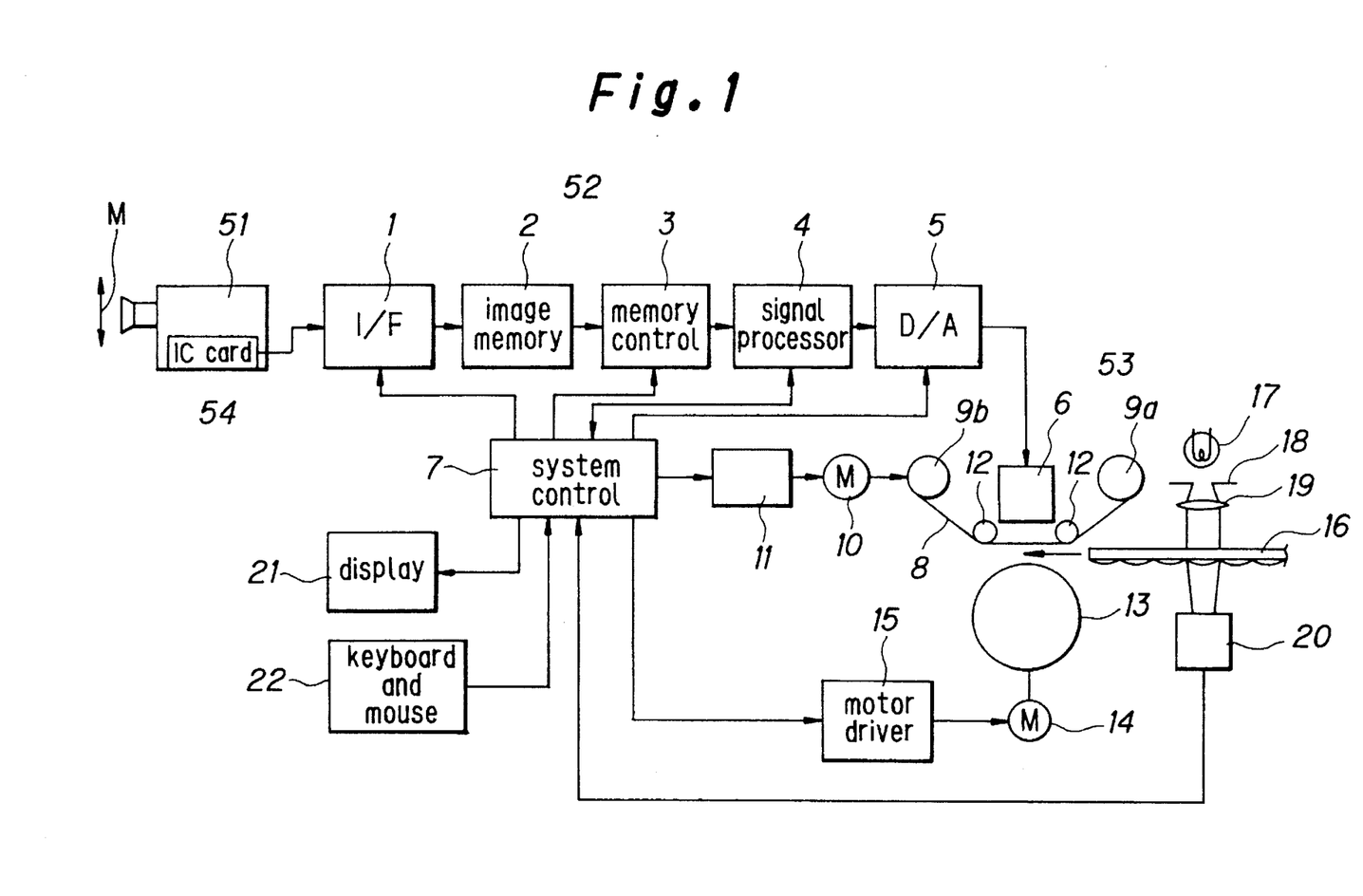
FIG. 1 is a block circuit diagram showing an outline of the construction of the printing apparatus for embodiments of the invention.

In the printer apparatus for this embodiment of the invention, n images (for example, 4) are superimposed and printed on, for example, a lenticular lens sheet 16 along a first direction of a lenticular lens. If these images are then viewed via the lenticular lens, an image which is selected from these n images is seen as having returned to the size of the original. As is shown in FIG. 1, this printing apparatus is made up of an image printer 53 for printing the images and a computer 52 for controlling the image printer 53. As is described below, while the plurality of images is being superimposed and printed, the lengths of these pixels may be shortened in a first direction and printed so as these images are overlaid or superimposed. Also, the shape of each of the pixels printed while the plurality of images are being superimposed and printed may be flattened so as to become narrower and the length of the pixel in the first direction may therefore be reduced. This would mean that by reducing the unit length of the pixels in the first direction, the number of pixels may be increased.

A description of the printing theory for the printing apparatus in this embodiment of the invention will now be given using diagrams from FIGS. 2 onwards, after which a detailed structure in FIG. 1 will be described.

Figure 2:
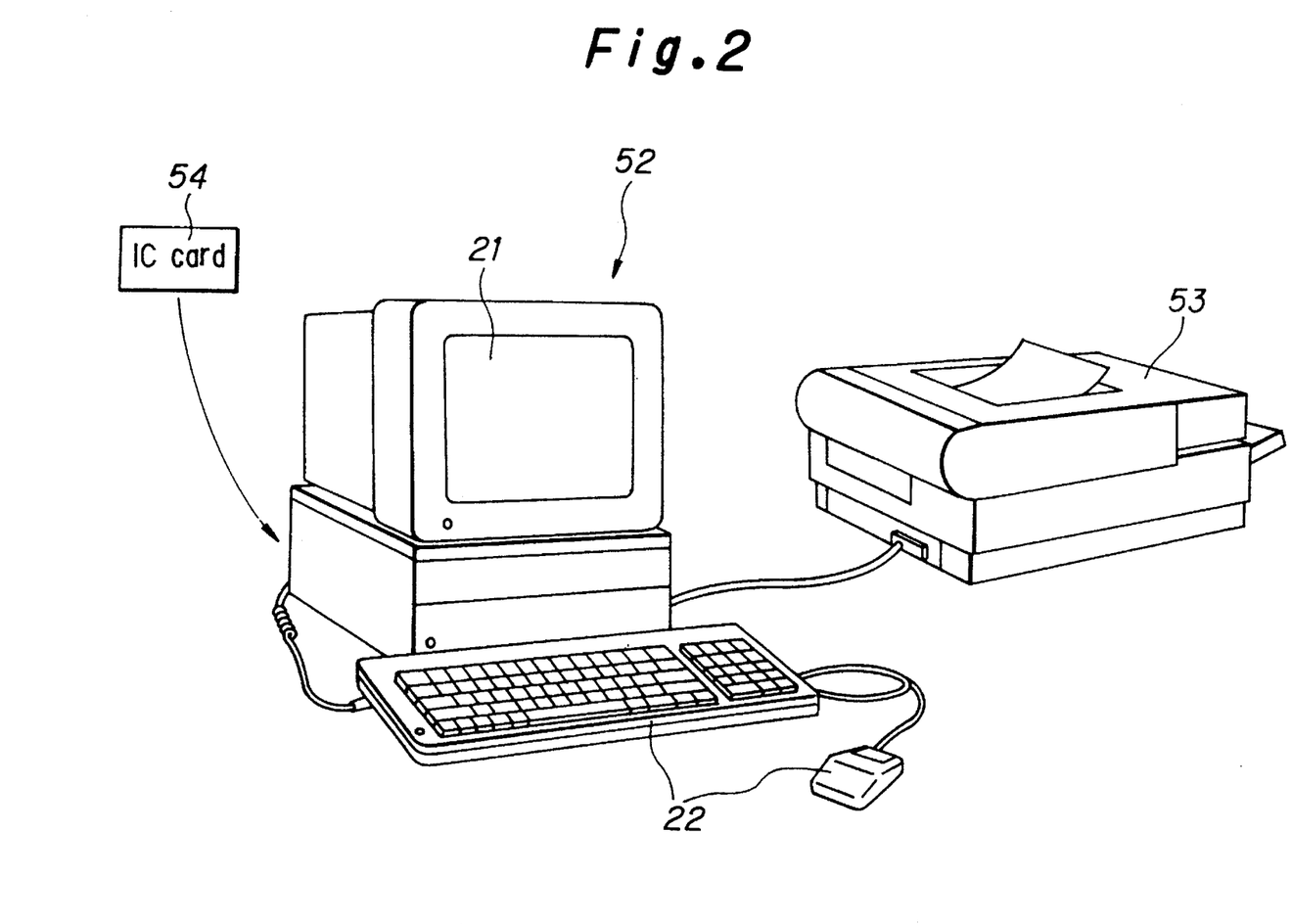
FIG. 2 is a perspective view of the arrangement of the system for the embodiments of the invention.

FIG. 2 is a perspective view of the structure in FIG. 1 being applied to an actual system. In this system in FIG. 2, a print image which appears to be three-dimensional is printed directly onto the lenticular lens sheet described previously by the image printer 53.

Figure 3:
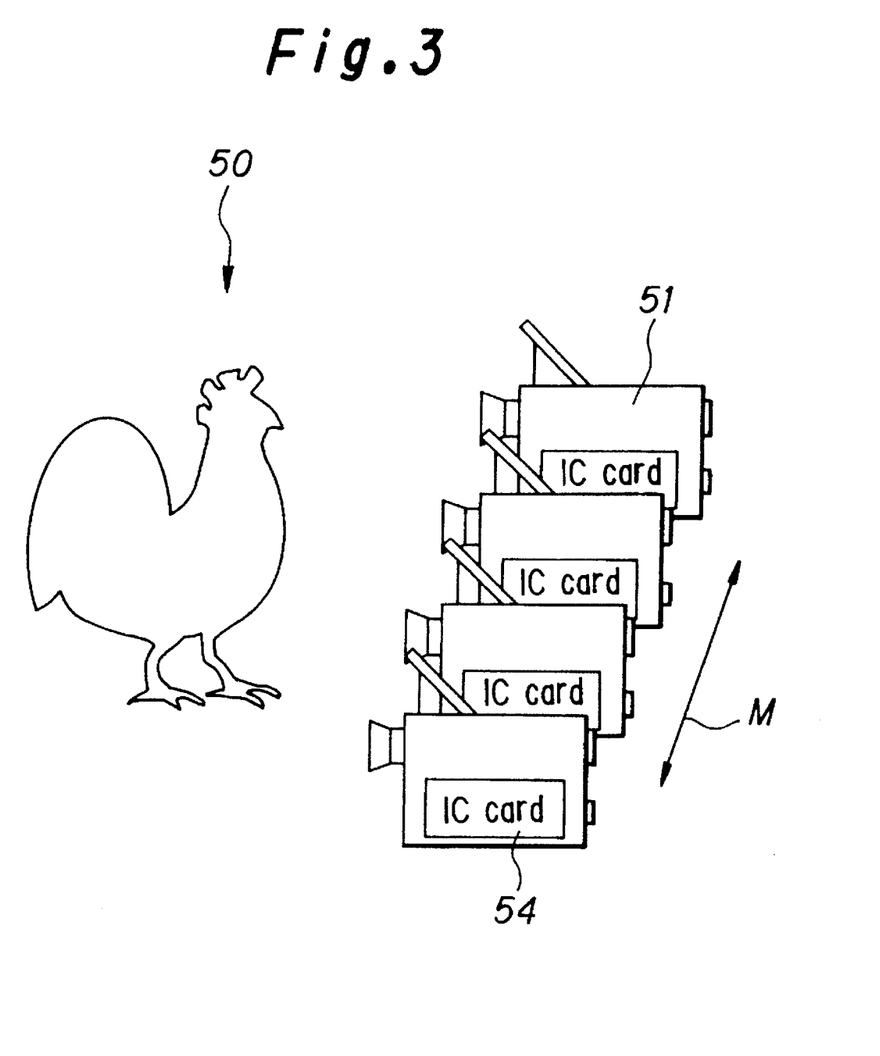
FIG. 3 is a view showing the situation when a number of images n are taken with a single camera.

Next, in this embodiment, as is shown in FIG. 3, by using an electronic still camera 51 for recording an image into an IC memory card, n images are taken of the same object 50 while moving the single electronic still camera 51 in a direction indicated by the arrow M in the figure, for example, in a horizontal direction in order to obtain a suitable constant parallax. FIG. 3 shows the single still camera 51 in the same figure each time as it is shifted along the direction indicated by the arrow M.

The sampling height and width of the picture data for when the images were taken n times can be taken as having been height:width=1:1, i.e. in the form of a square grating, and height:width=a:1. The image data recorded in the IC memory card 54 for the n times which images were taken is then read in by the system computer 52 in FIG. 2, i.e. a main processor for example, which functions as the system control circuit 7 in FIG. 1. After this data which has been read in has been processed to give a picture output for outputting on the computer 52, for example, the kind of rearrangement of the picture data described in the following, the image data is sent to the printer 53 for printing. This printer 53 may, for example, be a heat sensitive sublimation type image printer with a thermal line head.

The algorithm for rearranging the image data in the computer 52 for this embodiment of the present invention is the same as the method described in Television Association Magazine Vol. 45, No. 11 entitled 50-inch multi-vision three-dimensional television not requiring glasses with the exception of the following point.

Figure 4A:
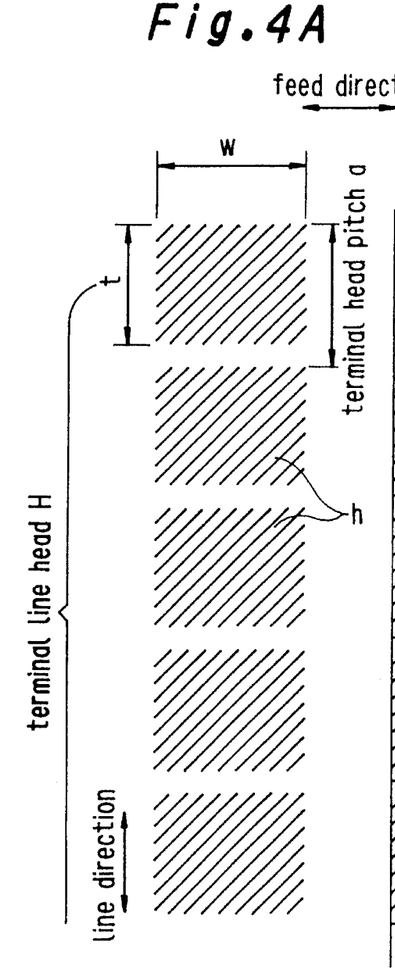
FIGS. 4a and 4b are views showing the usual printer pixel shape and feed.
Figure 4B:
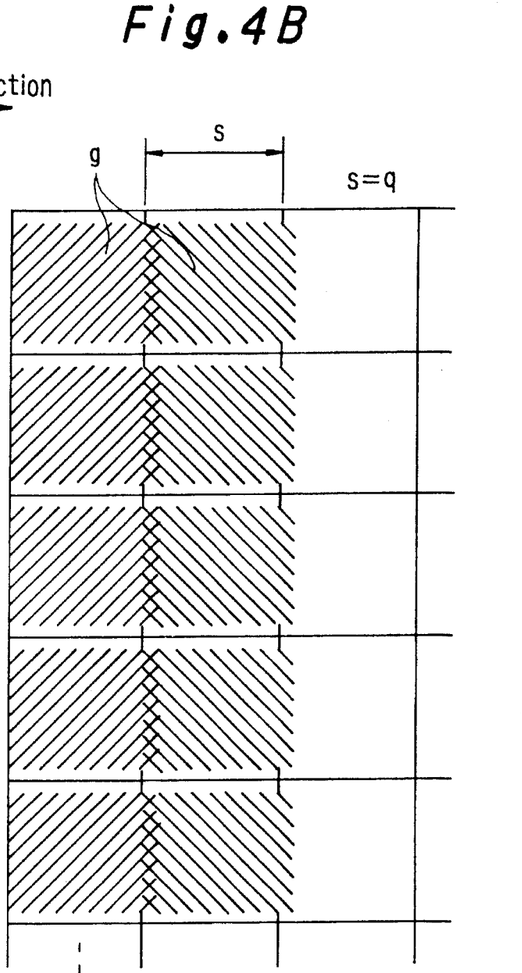

Usually, with thermal sublimation type image printers having a thermal line head, the relationship between the flat arrangement of the unit heads h which make up the thermal line head H, and the feed pitch s, is as that shown in FIG. 4(a) and FIG. 4(b), in which each unit head h corresponding to one pixel is made to be rectangular and the feed pitch s is equal to the pitch q (s=q) of the unit heads h in the line direction. In the case of analog input image printers, the feed pitch is set by the sampling rate along the horizontal direction of the image. The size of a pixel for printing for a single unit head is then t×w. Also, FIG. 4(a) shows the flat arrangement for each of the unit heads h in the line head H and FIG. 4(b) shows each of the pixels g printed by the same line head H.

Figure 5A:
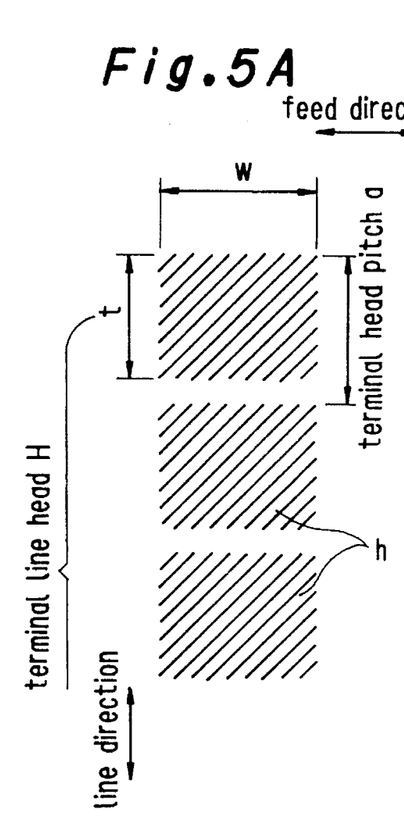
FIGS. 5a and 5b are views showing the printer feed for a first embodiment.
Figure 5B:
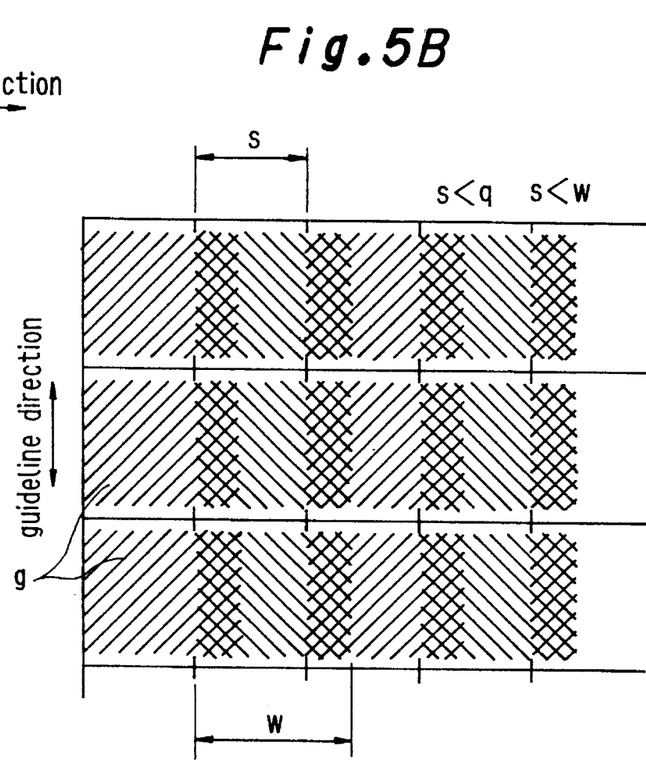

With regards to this, in the first embodiment of this invention, as is shown in FIG. 5(a) and FIG. 5(b), printing is carried out by superimposing images in the row direction, i.e. the direction at right angles to the generating lines, of the semi-cylindrical lenticular lens so that the number of pixels per unit length is increased thereby increasing the resolving power. Here, FIG. 5(a) shows the flat arrangement for each of the unit heads h in the line head H and FIG. 5(b) shows each of the pixels g printed by the same line head H. In FIG. 5, the superimposed printing of the image is then achieved by making the feed pitch s smaller than the width w of the unit head h, pixel size in the aforementioned first direction, and the head pitch q, thus s<w, and s<q.

In this embodiment, while the n pixels are being superimposed in rows, for the case where a fixed number of pixels m are used for the image within each pitch, which in this embodiment m=1, the feed pitch s, from equation 1, becomes substantially $$s=p/(n\times m) \quad (1)$$

In this way, a group of n pixels or image elements can be repeatedly overlaid or multi-superimposed within one pitch p between the semi-cylindrical shaped lenses 101, 102, 103, ... when printed. This means that the number of pixels along the direction of the generating line for the semi-cylindrical shaped lenses can be increased and it becomes possible to increase the resolving power along this direction.

Figure 6A:
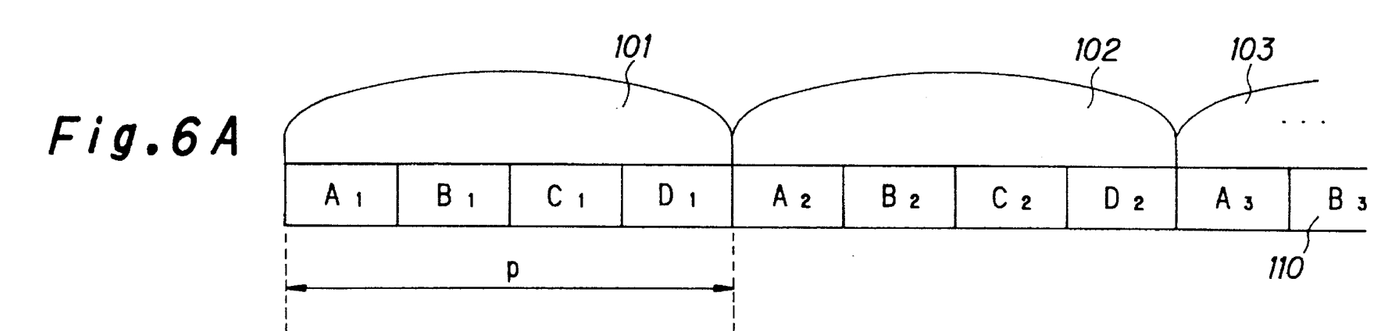
FIGS. 6a and 6b are views showing the arrangement of each of the pixels occurring in the printing in the first embodiment.
Figure 6B:
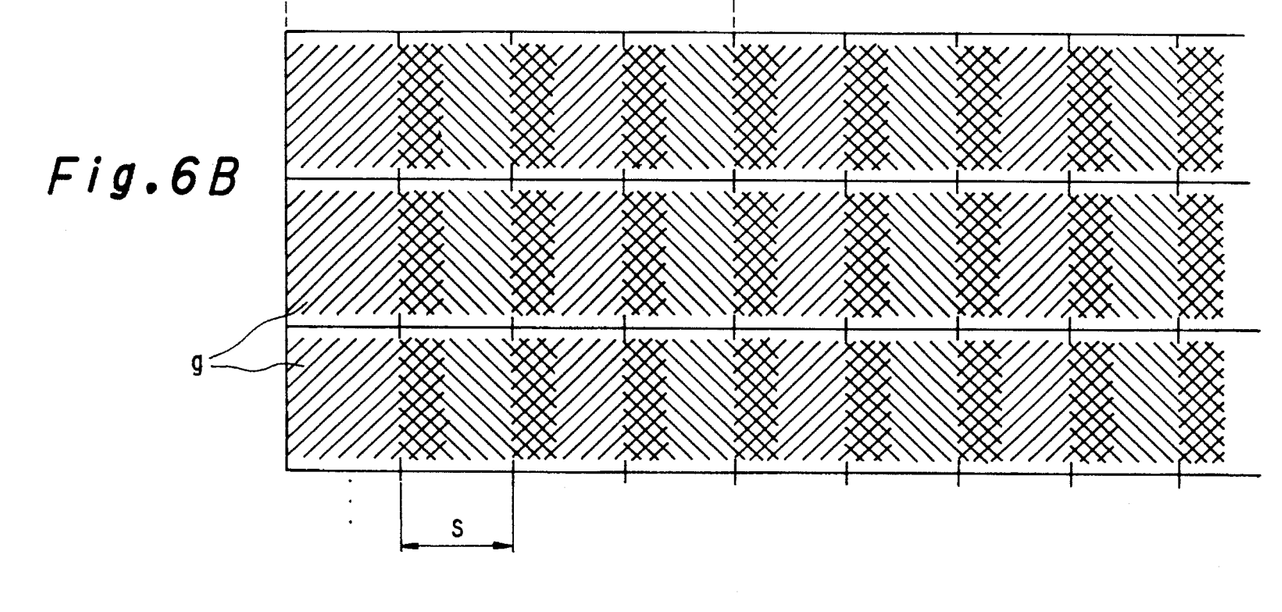

Printing according to this embodiment corresponding to the case shown in FIG. 11(a) and (b) and FIG. 12(a) and (b) is shown in FIG. 6(a) and (b). Namely, as is shown in FIG. 6(b), by superimposing each of the pixels laid in the pitch p between each of the semi-cylindrical shaped lenses, the resolution can be increased. Therefore, according to the printing apparatus for this embodiment, printing may be carried out without cancellation of the pixels which occurred in the aforementioned prior art or with reducing the amount of the cancellation.

In order to carry out the process in this way, for example, the feed for the lenticular lens sheet at the image printer 53 may be determined at the computer 52 by measuring the pitch p between the lenticular lenses at the printer 53 or by transmitting data for the lenticular lens pitch p and the size w of the pixels in the first direction between the computer 52 and the image printer 53.

Figure 7A:
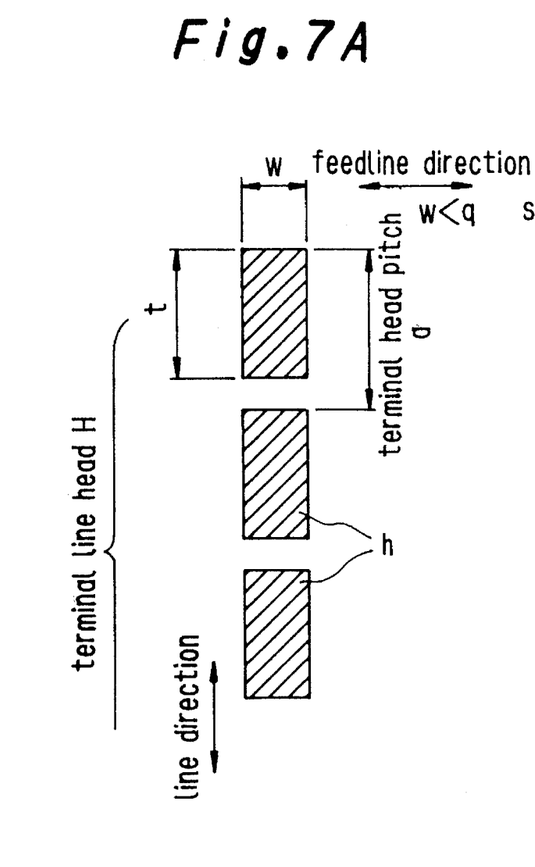
FIGS. 7a and 7b are views showing the pixel shape and feed for the printer in a second embodiment.
Figure 7B:
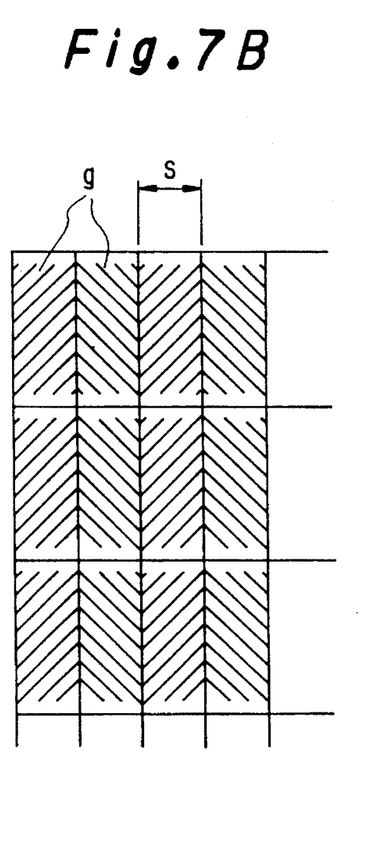
Figure 8A:
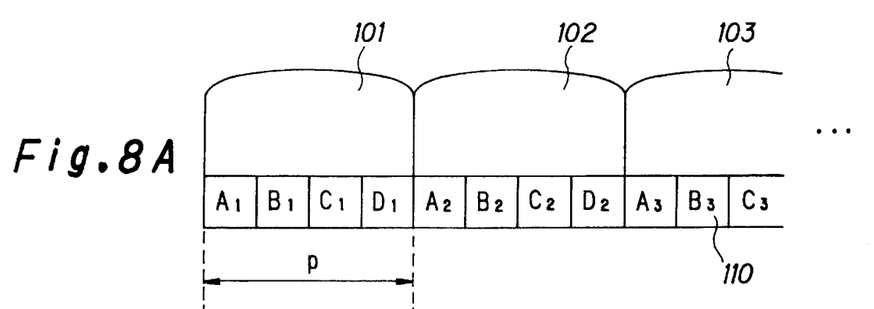
FIGS. 8a and 8b are views showing the arrangement of each of the pixels in the printing for the second embodiment.
Figure 8B:
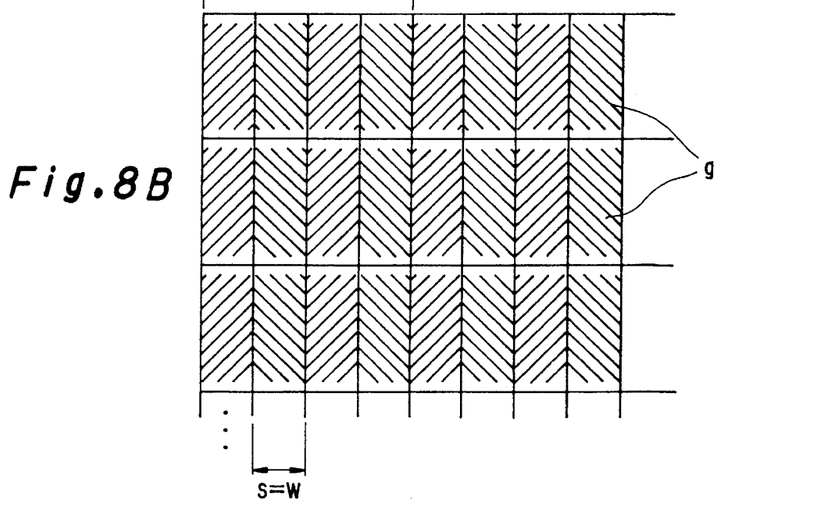

Next, an embodiment where the shape of the unit heads h for the printer 53 is made narrow in the feed direction, where w<t in w×t, and where the feed pitch s will be equal to the picture image size w in the first direction s≈w so that the resolution may be increased, as shown in FIG. 7(a) and (b), will be taken as a second embodiment of this invention. In doing this, as only one element per pitch p is enlarged along the row direction, i.e. the direction at right angles to the generating lines, of the semi-cylindrical lenses when viewing takes place via the lenticular lens, a print with a pixel arrangement suitable for viewing via a lenticular lens becomes possible.

Accordingly, by making the pixel size w in the first direction to be that shown substantially by equation (2);

$$w = p/(n \times m) \quad (2)$$

and by making the feed pitch s to be equal to the pixel size w in the first direction s≈w, as is shown by that in FIG. 6b which is the same as that shown in FIG. 7(b). If n compressed square pixels are gathered from different perspectives by the electronic still camera source 51, they can be lined up within one pitch p of the lenticular lens for outputting. When viewing is carried out from a specific direction, just the pixel within the one pitch for this particular direction will be selected from within the one pitch, and a picture will be displayed resembling that originally taken by the source.

When carrying out that described above, if, for example, relationships such as those in equation 1 and equation 2 are not completely satisfied, there is the chance that there will be a shift in the ratio between the height and width of the source image and that the image will be distorted. For this case, a third embodiment is shown in FIG. 9(a) to (d) where the image resolution is improved without the occurrence of distortion by combining a method of correcting the height to width ratio of the image with the method described above.

Figure 9A:
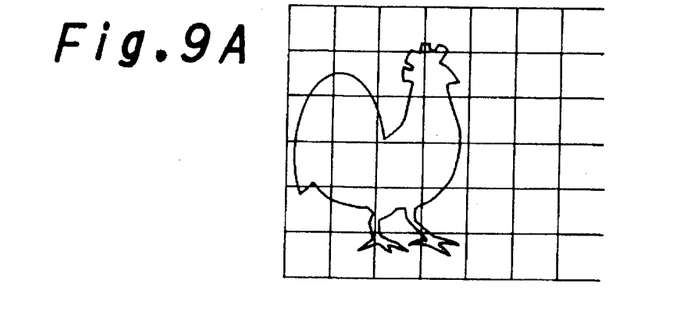
FIGS. 9a, 9b, 9c and 9d are views showing the correction of the height to width ratio by re-sizing in a third embodiment.
Figure 9B:
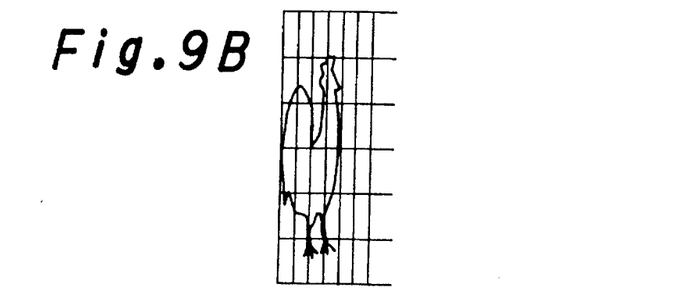
Figure 9C:
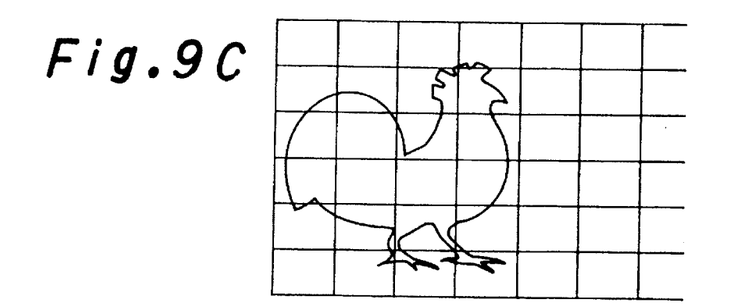
Figure 9D:
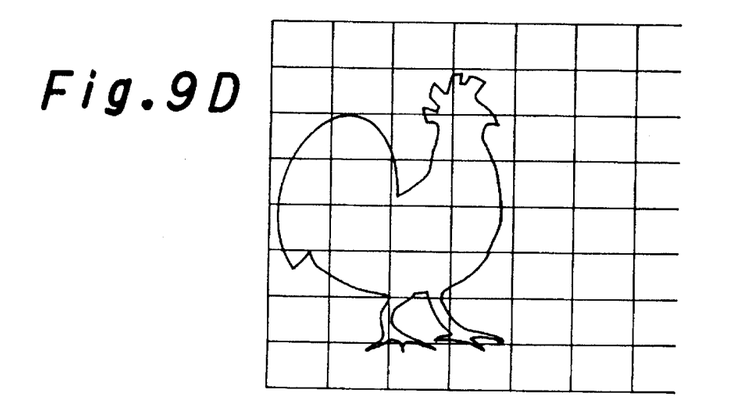

One of the source images from the n original images is sampled as a square grid of pixels as shown in FIG. 9(a). With the printing apparatus in this embodiment, as is shown in FIG. 9(b), the feed pitch s for the line head is reduced in the way described above, or a flat head is used, and reduction is carried out, for example, 1/k times, in the first direction, which is the direction at right angles to the generating lines of the lens. The pixels for this reduced image are then distributed in such a manner that underneath the lenticular lens there is a pixel for each pitch p of the semicylindrical shaped lens.

If the kind of reduced image shown in FIG. 9(b) is then viewed via a lenticular lens, it is enlarged n times in the first direction, and an image of the kind shown in FIG. 9 (c) can be seen. If n≠k, then distortion relating to the height to width ratio of the original source image will occur when the image is viewed through a lenticular lens.

Accordingly, in this third embodiment, for example, if the number of pixels is increased n/k times, printed so that the image is then enlarged by a lenticular lens, it is possible to correct or re-size the height/width ratio of the image to be the same as that of the original image.

In the description of this third embodiment, correction was carried out on distortion which occurred when the image was sampled in a square grating manner and the feed pitch s was reduced. However, correction of distortion can be carried out by applying the same principles when the height/width ratio is not that of a square grating. For example, the same distortion correction as that described above can be carried out when the height to width ratio is height : width =a: 1 by making the number of pixels in the height direction a x p/q.

Returning to FIG. 1, the following is a description of the structure shown in FIG. 1.

In FIG. 1, image data stored in the IC card 54 for the electronic still camera 51 is provided to the image data digital I/F circuit 1. The sampling height/width ratio for this image data is, for example, height: width =a : 1. This image data is sent to the image memory 2 via the I/F circuit 1.

The image memory 2 keeps the image data which it receives until the latter part of the processing for the image data acquired previously has been carried out. The image data held in the image memory 2 is then read out by the memory controller 3. The readout at this time is composed of the images which were taken from n different perspectives. Their reading out is then controlled so that the pixels are arranged in columns with each column corresponding to each different perspective being arranged within one pitch p of the lenticular lens. Control is carried out during the readout so that the image data is read out in the necessary order for the scanning direction of the line head of the image printer 53 and the predetermined signal processing at the front end signal processing circuit 4.

Predetermined signal processing, for example, color signal conversion, such as R, G, B to Y, M and C conversion is then carried out by the signal processing circuit 4 on the image data provided via the memory controller 3. The output from the signal processing circuit 4 is then converted to an analog signal by the D/A converter 5 before being sent to the image printer 53.

The data sent to the image printer 53 is then sent to the thermal head 6 of the sublimation method printer described previously.

A lenticular lens sheet 16 is provided at the image printer 53. The side of the lenticular lens sheet 16 on which the image is to be printed, the display side, is set to face the side of the thermal heads 6 before this lenticular lens sheet 16 is sent to the platen roller 13 by a supplier which is not shown in the figure. The platen roller 13, the lenticular lens sheet 16, a ribbon 8 soaked in sublimation paint and the thermal heads 6 are positioned next to each other in that order.

This ribbon 8 is supported on both sides of the thermal head 6 by guides 12, and is wound from the supply reel 9a onto the takeup reel 9b. The winding on of the ribbon 8 onto the take wheel is carried out by a motor 10 which is operated according to a drive signal sent from the drive circuit 11.

The platen roller 13 is also driven by a platen motor 14 which is under the control of the motor driver 15. Accordingly, the thermal head 6 imparts a heat to the ribbon whereby a paint or pigment impregnated to the ribbon is thermally transferred directly to the lenticular sheet 16.

This motor driver 15 is under the control of items such as a system control circuit 7 which may be, for example, a central processing unit or CPU and is as such controlled so that the platen motor 14 and thus the platen roller 13 are sent a distance equal to the feed pitch s for the lenticular lens sheet 16 in this embodiment described previously.

Figure 10:
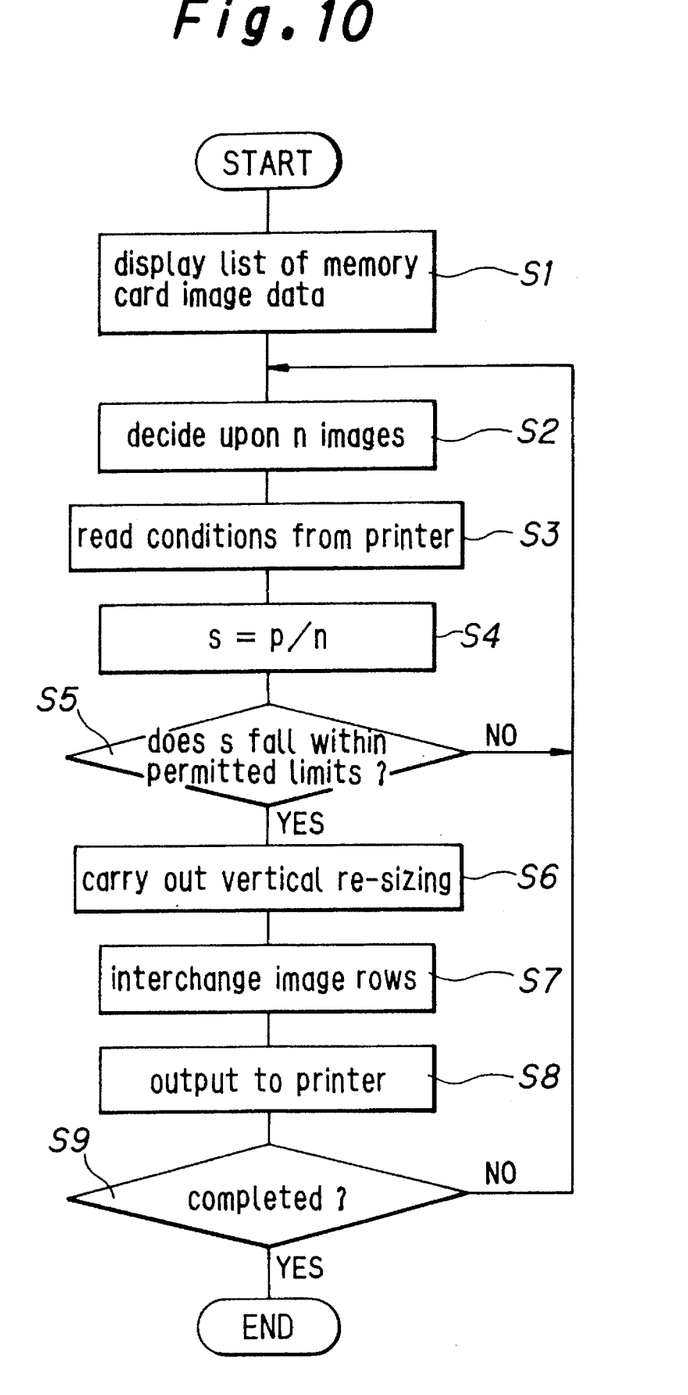
FIG. 10 is a flowchart of the processing which takes place at the system control circuit.

The printer 53 is controlled according to the control sequence in FIG. 10 at the system control circuit 7.

With regards to FIG. 10, in step S1, a list of the image data data sampled at a height: width ratio of a : 1 and which comes from the IC memory card 54 via the I/F circuit 1 is displayed entirely, for example, on the display 21 of the computer 52 in FIG. 2. Then, n images are selected from the contents of the list for the memory card 54 using the keyboard and the mouse 22 so that a three-dimensional print can be made and so that images are selected for superimposing and printing.

In step S3, data such as the pitch p for the lenticular lens sheet 16 currently being used, the permitted values for the feed pitch s, and the head pitch q is read out from the image printer 53 connected in the system.

In step S4, the arithmetic equation s=p/(n×m) is carried out. In this embodiment, m=1, so that s =p/n. In step S5, it is then determined whether the feed pitch s falls within the permitted limits or not. If the answer in step S5 is no, then the process proceeds to step S2, and if the answer is yes, the process proceeds to step S6.

The re-sizing of the height is then carried out in step S6. For instance, the height is re-sized so that the height to width ratio of the sampling of the source image becomes q/p. Specifically, the number of pixels in the height direction is made to be a×p/q.

Rows in the image are interchanged in step S7, and data is then outputted to the image printer 53 in step S8.

In the control process in FIG. 10, data such as the pitch p for the lenticular lens sheet 16 being used, the permitted values for the feed pitch, and the head pitch q is read out from the image printer 53 connected in the system and items such as the feeding of the lenticular lens sheet 16 are controlled based on this data. However, in the way described in the following, the system control circuit 7 detects the lens pitch p of the semi-cylindrical lenses for the lenticular lens sheet 16, and then carries out the control of items such as the feed pitch s of the of the lenticular lens sheet 16 based on this detection signal.

In this case, in the construction in FIG. 1, a light source 17, slit 18, lens 19 and a photosensor 20 are set up for detecting the positions of each of the semicylindrical lenses on the lenticular lens sheet 16.

Accordingly, light generated by this light source 17 passes through the slit 18 so as to form a narrow light beam. This light beam is then made to be a parallel light beam by the lens 19 and is projected at the lenticular lens sheet 16. This projected light is then converged by each of the semi-cylindrical shaped lenses on the lenticular lens sheet 16 and is then inputted to the photosensor 20. Here, when the center of the photosensor 20 and the center of a semi-cylindrical shaped lens coincide, the amount of light inputted to the photosensor 20 becomes a maximum and the photosensor detection output is also large. In this way, the position of each of the semi-cylindrical lenses on the lenticular lens sheet can be detected. At this time, as the distance between the photosensor 20 and the thermal head 6 is determined, the feed for the lenticular lens sheet 16 is known by the system control circuit 7 so as to coincide with the position of each of the semi-cylindrical lenses.

In the example in FIG. 1, detection has been carried out using the light from the light source 17 which passes through the lenticular lens sheet 16, but the light which is reflected by the convex surfaces of each of the semi-cylindrical lenses on the lenticular lens sheet could also be used.

As is made clear by the above description, with the printing apparatus in this embodiment, if the size of the feed for pixels in a first direction is reduced while a number of images are being superimposed and printed and these pixels are superimposed and printed, and if the shape of each of the pixel is made narrower in this first direction, the feed for each of the pixels in this first direction can be reduced by this narrowed amount. The number of pixels for each of the unit lengths of the pixels in this first direction can therefore be increased, and the resolution when viewing takes place in the direction for which the density of pixels is low in the enlarged image is increased.

Also, in the printing apparatus in this invention, while superimposing and printing n images at a fixedly repeated pitch p in the first direction, a fixed number of pixels m are printed for each image. If the feed pitch s for each pixel in the first direction is then taken to be $s = p/(n \times m)$ pixels corresponding to n images can be put within one pitch, and the resolution can therefore be increased.

Further, let the case be considered where the feed for all of the pixels is changed, and printing is carried out with the number of pixels within each unit length in the first direction increased by compressing the pixels in this direction, so that the ratio between the superimposing direction (one direction) and the direction perpendicular to it is no longer equal to one. In this case, distortion in the viewed image can be removed by printing with the feed for all of the pixels in the first direction having been corrected or re-sized.

According to the present invention, a printing apparatus can be realized which is versatile and is suitable for displaying directional images at a high resolution.

What is claimed is:

1. An image output apparatus including lenticular lenses, said apparatus printing images by superimposing and printing n images in a first direction on a substrate at a particular pitch p so that one of the n images is displayed through said lenticular lenses when being observed, comprising:

a printer for printing said n images; and a controller for controlling said printer, wherein a fixed number of pixels m are printed for each of said n images, and pixels m corresponding to the n images are printed within one pitch p wherein a feed s in the first direction for each of said pixels m is given substantially by $s = p/(n \times m)$ wherein the n images are being superimposed and printed.

2. The image output apparatus according to claim 1, wherein said pitch p corresponds to a pitch of said lenticular lenses.

3. The image output apparatus according to claim 1, wherein the feed s is adjustable and said printing is performed by said printer at a second pitch.

4. The image output apparatus according to claim 1, wherein a size w of the pixels m along the first direction is given substantially by $w = p/(n \times m)$.

* * * * *